Patented May 24, 1932

1,859,517

UNITED STATES PATENT OFFICE

LESTER KIRSCHBRAUN, OF LEONIA, NEW JERSEY, ASSIGNOR, BY MESNE ASSIGNMENTS, TO THE FLINTKOTE CORPORATION, OF BOSTON, MASSACHUSETTS, A CORPORATION OF MASSACHUSETTS

AQUEOUS DISPERSION AND PROCESS OF MAKING SAME

No Drawing. Application filed October 6, 1927. Serial No. 224,527.

This invention relates to the production of dispersions and more particularly has reference to aqueous dispersions of normally solid or semi-solid bitumens, such as asphalt and the like, and to improve methods for producing such dispersions.

The invention in one of its phases contemplates the use of the dispersive media under such conditions that the final product will contain exceedingly large quantities of the base dispersed as compared to the amount of dispersive media employed in producing the product. For instance, in United States Letters Patent issued to Louis Preaubert, et al, No. 812,593, patented Feb. 13, 1906, it has been shown that asphalt can be dispersed in an aqueous vehicle containing casein to the extent that there may be as high as nine times, on its basis of weight, the amount of asphalt relative to casein.

With the process of the present invention, on the other hand, materials such as bitumens or analogous bases may be dispersed in an aqueous medium to produce a product characterized by an extremely fine body, and in which the quantity of the dispersed base may be as high as 100 to 200 times, on the basis of weight, the quantity of the dispersive media, so that a water-free film of the product will be composed substantially entirely of the material dispersed, and will contain only a relatively insignificant amount of the dispersing agent.

In carrying out the invention in the form thus briefly described, I may initially treat a suitable quantity of casein with sufficient alkali to swell the casein whereby to form a more or less pasty and highly plastic mass. Thus, I may employ, for example, muriatic acid casein, in any desired quantity, which may be swelled with concentrated ammonium hydroxide to a thick paste. I have found, for example, that about 12 parts, more or less, by weight of the ammonium hydroxide is substantially sufficient to completely swell about 20 parts of the casein. In lieu of ammonium hydroxide, the casein may be swelled with sodium borate, the quantity of this latter alkali necessary to produce the desired amount of swelling being about 20%, more or less, by weight of the casein.

It may be desirable to adjust the hydrogen ion concentration of the casein prior to emulsification with a quantity of alkali to a pH value of between 7.5 and 9.0 pH, avoiding excess of alkali. Although emulsification will take place at higher concentrations of hydrogen ion, emulsion products do not possess as good a water resistant film as is the case where dispersion takes place under the conditions set forth above. The proportions cited when using sodium borate generally give the desired pH without further adjustment.

After the casein has been brought to a swollen condition, it may be placed in a suitable stirring or agitating mechanism and bitumen or other analogous base, in fluid condition, may be incorporated, for instance, in small increments alternating, for instance, with the addition of small quantities of water, while the mass is subjected to a rapid and continuous agitating action. It is important to note that the dispersing action as herein described is more successfully carried on by the alternate addition of the base and the water in small increments, since by this procedure the mass undergoing dispersion is constantly maintained in a highly plastic state during the dispersing action. This desirable degree of plasticity cannot be maintained where the total quantity of water which is to be present in the final product is added as a whole at the beginning of the operation, since the presence of the excessive quantities of the water thins out the mass to a considerable extent, and reduces its plastic properties. By adding the water in small increments the plasticity of the mass is maintained and the dispersing action is thereby greatly facilitated.

The above described procedure of adding the base and the water in increments may be continued as long as additional bitumen can be introduced and assimilated in dispersed form in the form of particles of sufficiently small size to be suspendable. Using an asphalt having a melting point of about 110° F., more or less, in the example above given wherein casein is treated with ammonium hydroxide, I have been able to disperse upwards of 100 parts by weight of asphalt to one part by weight of the casein, the final product containing about 20% to 30% of the aqueous phase and the dispersed phase being highly suspendable. Where the casein is swollen by means of sodium borate, asphalt of substantially the above named melting point may be dispersed in quantities ranging from 150 to 200 times, more or less, the weight of the dispersive media, the water content of such dispersion being about 20% to 25% more or less. Dispersions made in accordance with either of the foregoing illustrative procedures possess a very fine characteristic body.

The finished dispersion, if made with an excess of alkali, should preferably be now adjusted with acid such as HCl, oxalic acid or equivalent to a pH range between 4.6 to 9.0, in which range there is obtained optimum suspendability and resistance to water action for this type of product. Conditions of acid in excess may produce flocculation, so care must be taken to prevent such excess.

The present invention in another of its phases provides for the production of dispersions by means of dispersive media, comprising mineral powder types of dispersing agents and casein. Thus, for example, ball clay may be used, and by combining the same with casein the dispersing action may be facilitated so that the bitumen or other base may be brought to a finely divided and dispersed condition with greater ease than is possible when the ball clay alone is used as the dispersing agent.

In my Patent No. 1,691,768, patented Nov. 13, 1928, I disclose a method for assisting dispersion with clay-like material, such as New Jersey ball clay. Briefly, the said method consists in combining with the ball clay a second dispersing agent of much higher colloidality than the ball clay. This second agent is preferably in the form of a bentonite or bentonite-like material. When using these materials in combination, quantities are regulated so that the final composition will have a predetermined pH value at which point the dispersing action is most readily carried on. By combining casein instead of the bentonite-like material with the ball clay, the necessity for a fine adjustment of the quantities of the separate constituents is unnecessary so long as it is on the alkaline side, the approximate proportions as hereinafter given by way of example being generally adequate for carrying out the dispersion. However, as before, it is desirable to adjust the final product to the lower PH range referred to above in order to produce the best film.

In carrying out the foregoing method, I may combine, say, 10 parts, more or less, by weight of the ball clay in sufficient water to make a paste thereof, with 10 parts of casein and, say, one and seven-tenths parts more or less of sodium borate to swell the casein, the combined mixture in the form of a pasty mass being utilized in the manner above described as a media for effecting dispersion of a bituminous or other base. If asphalt of a melting point of about 100° to 200° F., more or less, is used, the above described media will efficiently disperse 50 to 60 times its own weight of the asphalt, and the resultant dispersion will be suspendable and bodied more heavily than a dispersion made with either ball clay alone or a mixture of bentonite and ball clay.

If desired, the same procedure may be adopted in making dispersions with mineral pigments. Thus, for example, powder pigments may be compounded with casein, previously swollen with an alkali such as sodium borate, and the mixture then employed in dispersing an oil, as for example, linseed oil, alone or hardened with resins, to produce a paint base of any desired color, depending upon the pigment used.

Carrying out the invention in another of its phases, I may utilize casein in combination with bentonite, one object being to produce a film whose water resistance is somewhat superior to that of a film formed from a dispersion made with bentonite alone as the dispersing agent. Bentonite is alkaline and its hydrogen ion concentration ranges from 8.0 to 9.5, more or less. Casein, on the other hand, is acidic, and its pH value is about 4.4. By combining these two agents in proportions of, say, 4 to 8 parts of bentonite to one part, more or less, of casein, the pH value of the mixture may be brought to about 7.1. The dispersing media produced with the proportions above set forth and brought to a pH value of about 6.2 with small amounts of acid is capable of dispersing 35 to 50 times its weight of asphalt, the dispersion in this case being relatively permanently suspendable and also heavily bodied and drying to a film which is more resistant to the action of water than is the case where the bentonite alone is used as a dispersing agent.

It is to be noted that when combining bentonite with casein, the swelling action of the latter is attained by virtue of the alkaline character of the bentonite itself, so that in this instance it is unnecessary to use sodium borate or other alkali.

In Patent No. 1,616,904, issued to me February 8th, 1927, I have set forth a process whereby dispersions of a highly viscous or paste-like consistency may be rendered more fluid by subjecting the dispersion to a rapid beating action, such action functioning not only to reduce the viscosity of the product, but also to impart thereto a heavy-bodied molasses-like consistency. In the present invention, however, this desirable heavy body is characteristic of the product as withdrawn from the dispersing apparatus, it being unnecessary in the present instance to resort to a separate heating stage, in order to impart the necessary body to the product.

In order to prevent the decomposition of the casein in products produced in accordance herewith, it is generally necessary to add a preservative. Where, however, sodium borate has been employed to swell the casein prior to the dispersing action, the preservative properties of this salt will serve to prevent putrefaction if present in sufficient amount. In other instances, where the swelling of the casein is accomplished by some agent other than sodium borate or equivalent swelling agent having preservative properties it may be necessary to add to the dispersion a definite preserving agent. For this purpose, I may employ formaldehyde, or other preservative which is not too highly basic nor of an acidic character, since the latter might tend to cause flocculation in the dispersion.

It is of course, desirable not to employ a preservative which is highly alkaline nor one which is of acidic character for the reason that either will tend to disturb the hydrogen ion concentration of the system. It is also not desirable to introduce preservatives which are water soluble and remain in the final film. Formaldehyde, which is volatile, appears to be particularly adaptable for this purpose as the quantity used (1 part to about 500 parts, more or less, of the emulsion by volume) is too small to disturb the casein.

One of the advantages of dispersions produced as herein described, either with casein alone or with casein combined with other agents, is that the final dispersion is particularly resistant to the action of salt water. These dispersions would, therefore, be very readily adaptable as protective coatings.

By combining comminuted material such as fiber or mineral filler, or both, with the dispersions produced as above described, I may obtain compositions highly suitable for use as flooring mixtures.

I have referred in the foregoing description to dispersing asphalt. It is to be understood that the invention broadly contemplates the dispersing of all types of bitumens, including coal tar, and the term "bituminous" as used in the claims is to be construed to embrace asphalt, coal tar and analogous bases.

I claim as my invention:

1. The process of producing aqueous dispersions of bituminous material, which comprises treating a protein to cause the same to assume a swollen plastic condition, and alternately adding bituminous material and water in separate increments to the mass while subjecting same to continuous agitation.

2. A process of dispersing a bituminous material in an aqueous vehicle, which comprises adding said bituminous material and water alternately in small increments to a mass containing casein and a swelling agent, subjecting the mass and the added bituminous material and water to agitation, and maintaining the mass undergoing dispersion in a highly viscous state during the dispersing action.

3. A step in a process of dispersing bituminous material in an aqueous vehicle by means of a dispersing agent comprising casein and a swelling agent, which comprises adding the bitumen in small increments alternating with an addition of water, while the mass undergoing dispersion is subjected to a rapid and continuous agitating action.

4. The process of producing aqueous dispersions of bituminous material, which comprises treating a protein to cause the same to assume a swollen plastic condition, and adding bituminous material and water in small increments to the mass whereby to maintain the mass in plastic condition while subjecting the mass to agitation.

5. The process of producing aqueous dispersions of bituminous material, which comprises making an aqueous mixture of casein, clay and a swelling agent in quantity sufficient to cause the casein to assume a swollen plastic condition, and adding bituminous material and water thereto in small increments while subjecting the mass to agitation to disperse the bituminous material.

6. The process of producing aqueous dispersions of bituminous material, which comprises treating casein and water with sufficient bentonite to cause the casein to assume a swollen plastic condition, and adding bituminous material and water in small increments thereto while subjecting the mass to agitation to disperse the bituminous material in the water.

7. A process of producing aqueous dispersions of bituminous material, which comprises treating casein with sufficient alkali to swell the casein and form a plastic mass, adding to said mass bituminous material and water in small increments while the mass is subjected to agitation, and continuing the introduction of the bituminous material and water in small increments until further additions of bituminous material will not be dispersed.

8. The process of producing aqueous dispersions of bituminous material, which comprises treating casein with sufficient alkali to swell the casein and form a plastic mass, adding to said plastic mass bituminous material and water maintaining the mass in plastic condition, subjecting the mass to agitation, and maintaining the mass in highly plastic state during agitation by adding further quantities of bituminous material and water in small increments.

9. The process of producing aqueous dispersions of bituminous material, which comprises treating casein with sufficient alkali to swell the casein and form a highly plastic mass, adding to said mass bituminous material and water maintaining the mass in plastic condition effecting dispersion of said bituminous material by subjecting the mass to agitation, and continuing the addition of bituminous material and water in small increments while subjecting the mass to continuous agitation and while maintaining the mass in highly plastic state.

10. The process of producing aqueous dispersions of bituminous material, which comprises treating a protein with sufficient alkali to cause the protein to assume a swollen plastic condition, adding bituminous material and water thereto maintaining the mass in plastic condition, subjecting the mass to agitation while intermittently adding additional bituminous material and water in small increments and continuing said agitation to disperse the bituminous material.

11. The process of producing aqueous dispersions of bituminous material, which comprises treating a protein with a swelling agent to cause the protein to assume a swollen plastic condition, making an aqueous mixture of said protein and a mineral colloid, adding bituminous material to the mass maintaining the mass in plastic condition, subjecting the mass to agitation, intermittently adding additional bituminous material and water in small increments to the mass and continuing the agitation to effect dispersion of the bituminous material.

In testimony whereof I affix my signature.

LESTER KIRSCHBRAUN.